(12) United States Patent
Larson

(10) Patent No.: US 9,409,657 B2
(45) Date of Patent: Aug. 9, 2016

(54) APPARATUS TO INTERFACE A BOARDING BRIDGE AND A LOW DOORSILL AIRPLANE

(71) Applicant: East Island Aviation Services, Inc., Melville, NY (US)

(72) Inventor: James Larson, Lloyd Harbor, NY (US)

(73) Assignee: East Island Aviation Services, Inc., Melville, NY (US)

( * ) Notice: Subject to any disclaimer, the term of this patent is extended or adjusted under 35 U.S.C. 154(b) by 0 days.

(21) Appl. No.: 15/013,679

(22) Filed: Feb. 2, 2016

(65) Prior Publication Data

US 2016/0152349 A1     Jun. 2, 2016

Related U.S. Application Data

(63) Continuation of application No. 14/274,270, filed on May 9, 2014, now Pat. No. 9,284,066.

(60) Provisional application No. 61/830,431, filed on Jun. 3, 2013.

(51) Int. Cl.
| | | |
|---|---|---|
| *E01D 15/00* | (2006.01) | |
| *B64F 1/305* | (2006.01) | |
| *E01D 15/12* | (2006.01) | |
| *E01D 18/00* | (2006.01) | |

(52) U.S. Cl.
CPC .............. *B64F 1/3055* (2013.01); *E01D 15/12* (2013.01); *E01D 18/00* (2013.01)

(58) Field of Classification Search
CPC ........ B64F 1/3055; E01D 15/12; E01D 18/00

USPC .................................................. 14/69.5, 71.5
See application file for complete search history.

(56) References Cited

U.S. PATENT DOCUMENTS

| | | |
|---|---|---|
| 2,470,337 A | 5/1949 | Campbell |
| 2,828,757 A | 4/1958 | Thaxton |
| 3,131,705 A | 5/1964 | Marino |
| 3,538,528 A | 11/1970 | Porter et al. |
| 3,687,321 A | 8/1972 | Goodhart et al. |
| 3,722,017 A | 3/1973 | Gacs et al. |
| 3,845,591 A | 11/1974 | Stine |
| 3,944,096 A | 3/1976 | Carder |
| 3,964,118 A | 6/1976 | Meyers et al. |
| 4,084,713 A | 4/1978 | Rohrs et al. |
| 4,161,049 A | 7/1979 | Saunders et al. |

(Continued)

OTHER PUBLICATIONS

International Search Report issued in International Application No. PCT/US2014/037540 on Sep. 18, 2014.

*Primary Examiner* — Raymond W Addie
(74) *Attorney, Agent, or Firm* — Hoffmann & Baron, LLP

(57) ABSTRACT

An apparatus to interface a cab section of a boarding bridge having a first deck and an airplane having a second deck. The apparatus includes a lower-frame assembly, upper-frame assembly, bridge gangplank assembly, and airplane gangplank assembly. The lower-frame assembly includes a plurality of wheel assemblies. The upper-frame assembly is connected to the lower-frame assembly at adjustable height and pivoting position, and includes a third deck atop the upper-frame assembly. The bridge gangplank assembly is connected to a first end of the upper-frame assembly, and includes a fourth deck to connect the first deck and the third deck. The airplane gangplank assembly is connected to a second end of the upper-frame assembly, and includes at least a fifth deck to connect the third deck and the second deck.

22 Claims, 16 Drawing Sheets

(56) References Cited

U.S. PATENT DOCUMENTS

| | | |
|---|---|---|
| 4,319,376 A | 3/1982 | Saunders |
| 4,344,200 A | 8/1982 | Farr et al. |
| 4,488,326 A | 12/1984 | Cherry |
| 4,517,698 A | 5/1985 | Lamp'l et al. |
| 4,553,720 A | 11/1985 | Harder |
| 4,768,617 A | 9/1988 | Mason et al. |
| 5,105,915 A | 4/1992 | Gary |
| 5,603,343 A | 2/1997 | Larson |
| 6,055,692 A | 5/2000 | Pell et al. |
| 6,212,724 B1 | 4/2001 | Zhou |
| 7,069,611 B2 | 7/2006 | Larson |
| 7,836,536 B2 | 11/2010 | Motohashi et al. |
| 8,069,518 B2 | 12/2011 | Saito et al. |
| 8,266,750 B2 | 9/2012 | Peterson |
| 2002/0100128 A1 | 8/2002 | Tholen et al. |
| 2003/0145404 A1 | 8/2003 | Hutton |
| 2004/0019984 A1 | 2/2004 | Hutton |
| 2007/0136961 A1 | 6/2007 | Shen et al. |
| 2008/0184502 A1 | 8/2008 | Roberts |
| 2011/0119842 A1 | 5/2011 | Park |

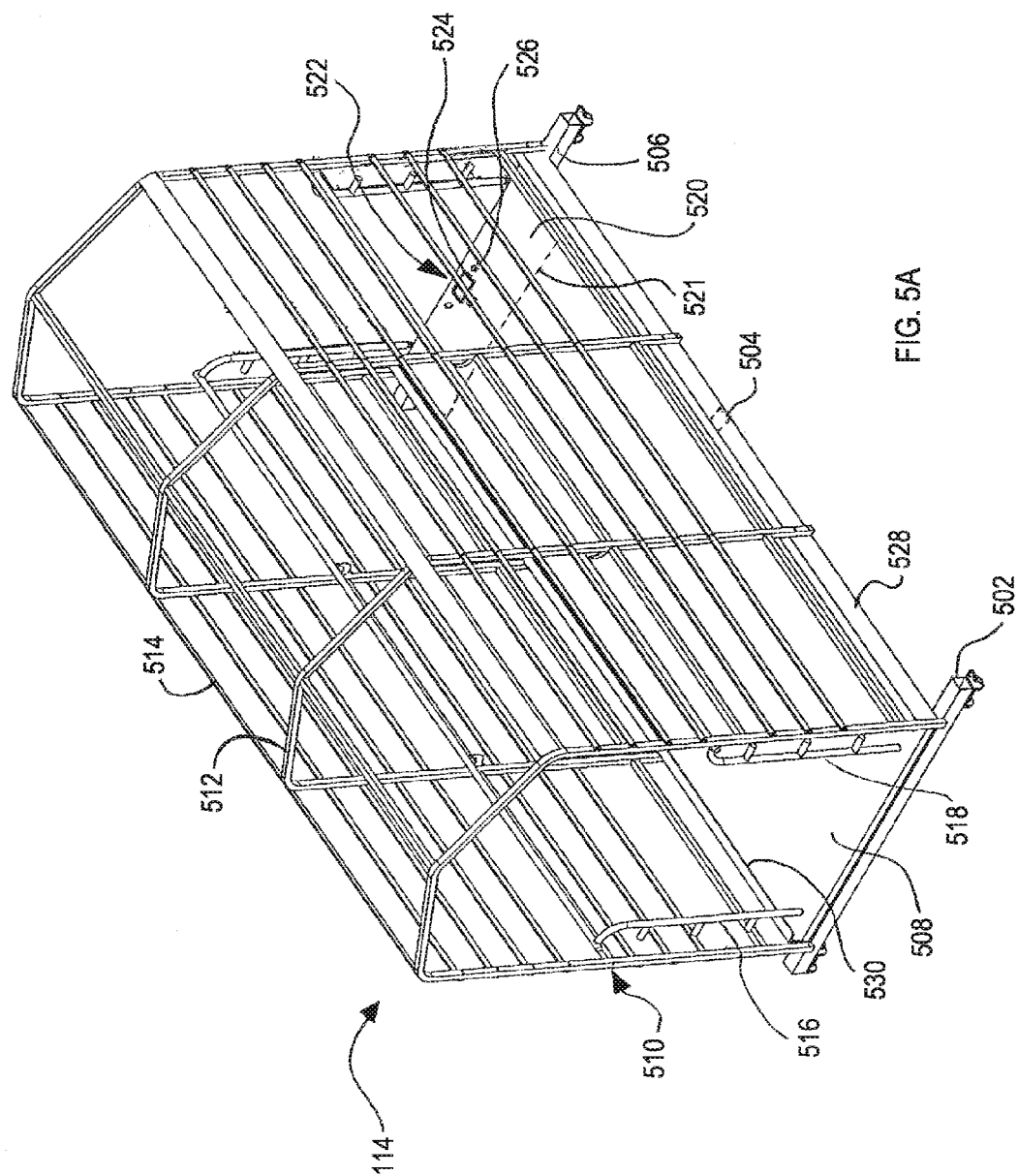

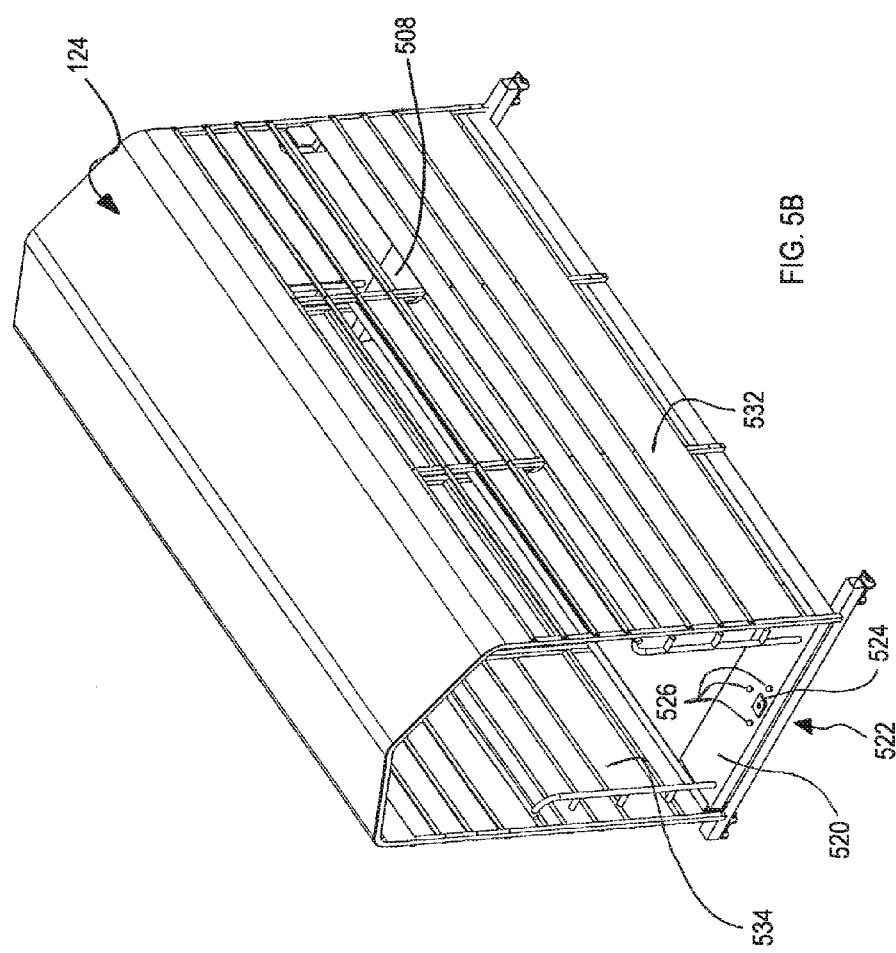

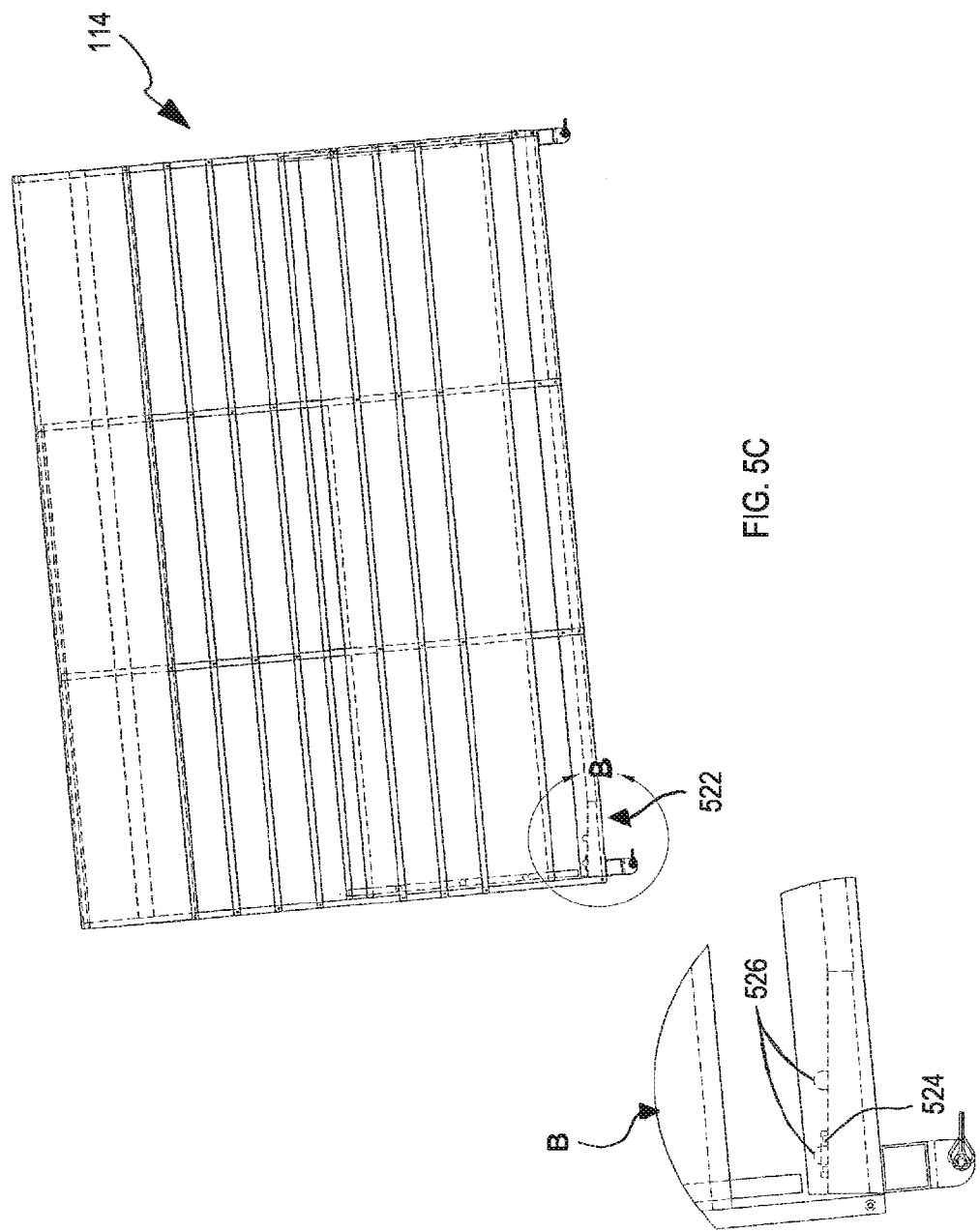

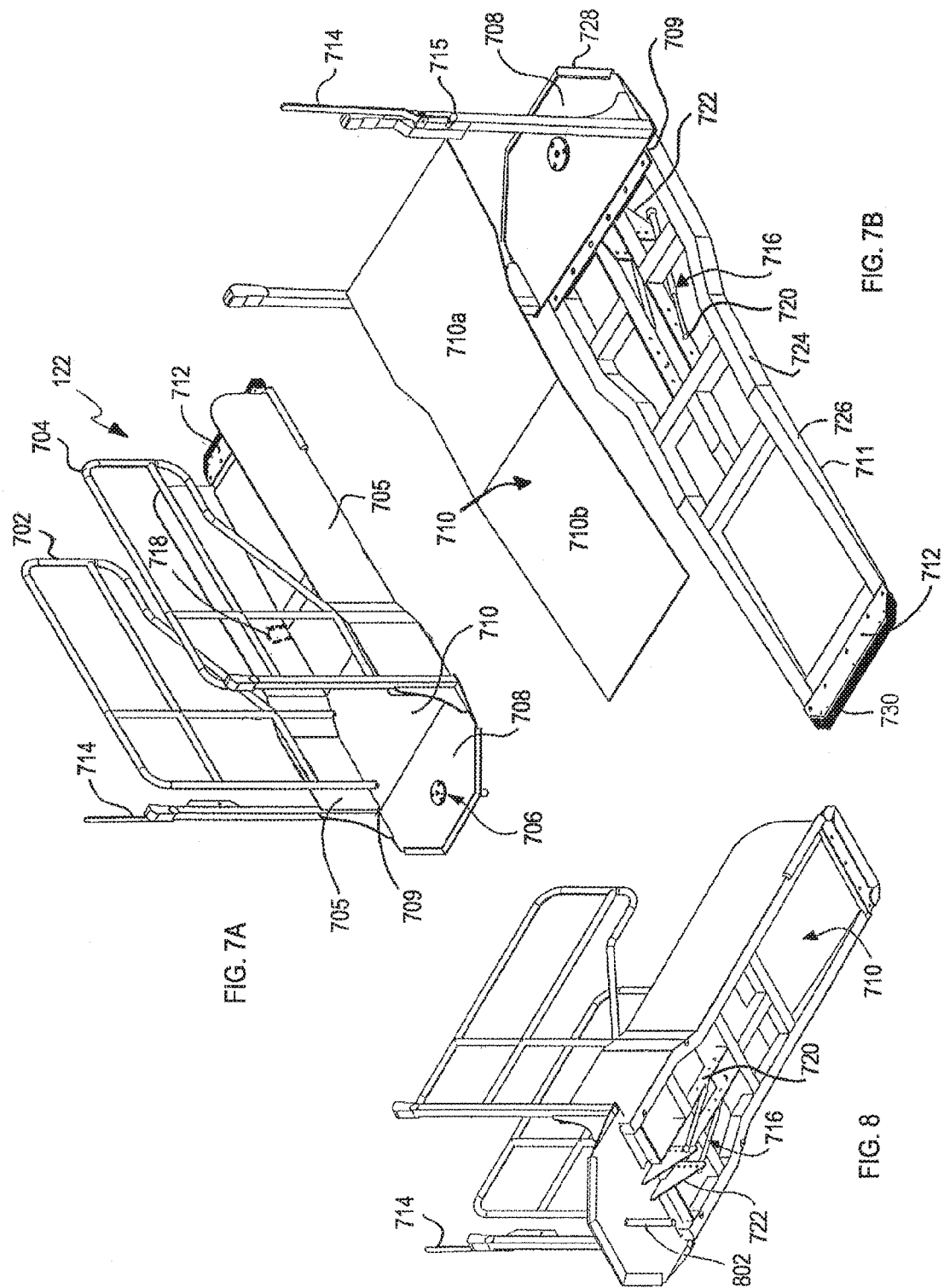

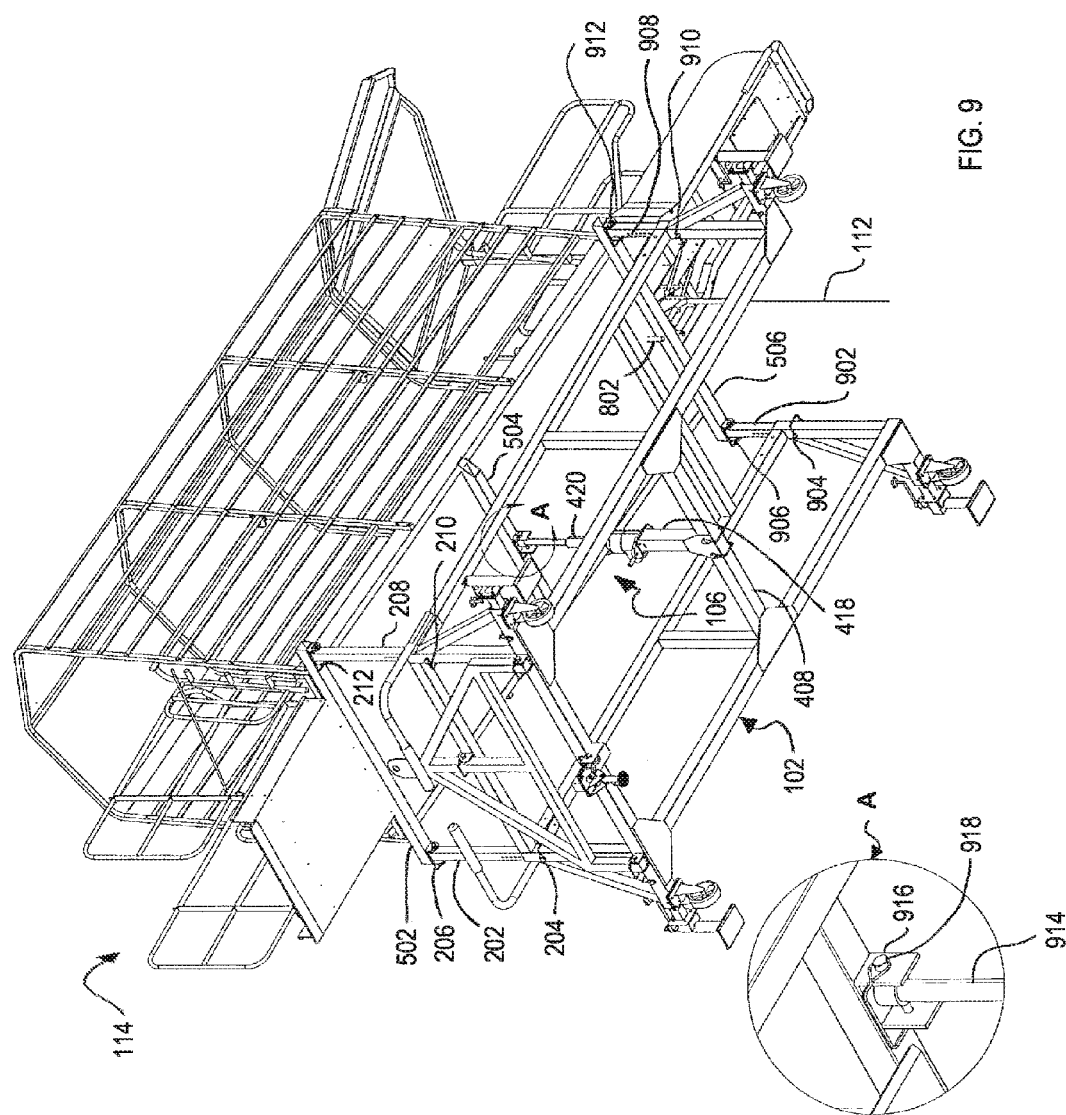

APPARATUS TO INTERFACE A BOARDING BRIDGE AND A LOW DOORSILL AIRPLANE

CROSS REFERENCE TO RELATED APPLICATIONS

This is a continuation of U.S. patent application Ser. No. 14/274,270, filed May 9, 2014, now U.S. Pat. No. 9,284,066 which claims benefit of U.S. Provisional Patent Application No. 61/830,431, filed on Jun. 3, 2013. The complete disclosures of these applications are hereby incorporated by this reference in their entirety for all purposes.

BACKGROUND

1. Field

The present application relates to airplane systems. More specifically, the present application is directed to an apparatus that interfaces a boarding bridge and a low-doorsill airplane.

2. Brief Discussion of Related Art

Boarding bridges, also known as loading bridges or jet bridges, are second-level bridges that enable passengers to board an airplane from a gate of an airport terminal and disembark (deplane) the airplane to the gate, efficiently without exposure to outside weather. Boarding bridges exhibit various configurations depending on factors such as airport terminal design, airplane doorsill height, fueling position, and other structural or operational requirements. Boarding bridges generally have retractable telescoping designs that include multiple tunnel sections allowing the boarding bridges to retract and extend (or telescope) to desired lengths to couple with arriving airplanes. The boarding bridges generally have two terminal sections, a rotunda section that connects a tunnel section to the gate and a cab section that connects a tunnel section to the airplane.

The cab section, controlled by an operator, can be raised or lowered, extended or retracted, and can pivot to accommodate or dock with airplanes parked on the tarmac at different orientations to the boarding bridge. The cab is generally provided with an accordion-like canopy that allows for a seal against the airplane. As such, boarding bridges provide enhanced access to aircraft for passengers with many types of disabilities and mobility impairments, as they may board and deplane without climbing stairs or using a specialized wheelchair lift.

While the cab of the boarding bridges can be raised or lowered to dock with the doorsills of some generally larger airplanes, the cab generally cannot accommodate smaller airplanes (e.g., regional airplanes) that have lower doorsill heights. In this case, the smaller airplane generally parks far away from the airport terminal, passengers board or deplane the airplane using stairs and similarly use stairs to enter the airport terminal (located at the second-level), and generally the passengers must be bussed between the airplane and the airport terminal and also monitored for safety and security compliance. This adds significantly to the operational budgets of the airlines and the airports, increases airport delays, exposes passengers to outside weather conditions, and requires special care and enhanced access for passengers with disabilities or other mobility impairments.

It is therefore desirable to provide an apparatus that can interface a boarding bridge to low doorsill airplanes that enables passengers to efficiently board and deplane such airplanes from a second-level gate of an airport terminal, mitigating exposure to the outside weather conditions.

SUMMARY

In accordance with an embodiment, an apparatus to interface a cab section of a boarding bridge having a first deck and an airplane having a second deck is disclosed. The apparatus includes a lower-frame assembly, upper-frame assembly, bridge gangplank assembly, and airplane gangplank assembly. The lower-frame assembly includes a plurality of wheel assemblies. The upper-frame assembly is connected to the lower-frame assembly at adjustable height and pivoting position, and includes a third deck atop the upper-frame assembly. The bridge gangplank assembly is connected to a first end of the upper-frame assembly, and includes a fourth deck to connect the first deck and the third deck. The airplane gangplank assembly is connected to a second end of the upper-frame assembly, and includes at least a fifth deck to connect the third deck and the second deck.

BRIEF DESCRIPTION OF DRAWINGS

Some embodiments are illustrated by way of example and not limitation in the figures of the accompanying drawings in which:

FIGS. 5A-5C illustrate an example upper-frame assembly of the apparatus of FIG. 1;

FIGS. 7A, 7B and 8 illustrate an example airplane gangplank assembly of the apparatus of FIG. 1;

FIG. 9 illustrates connection of the lower frame assembly to the upper-frame assembly of the apparatus of FIG. 1;

DETAILED DESCRIPTION

An apparatus to interface a boarding bridge and a low doorsill airplane is disclosed. In the following description, for the purposes of explanation, numerous specific details are set forth in order to provide a thorough understanding of particular embodiments. It will be evident to one skilled in the art, however, that certain embodiments may be practiced without these specific details.

Figure 1:
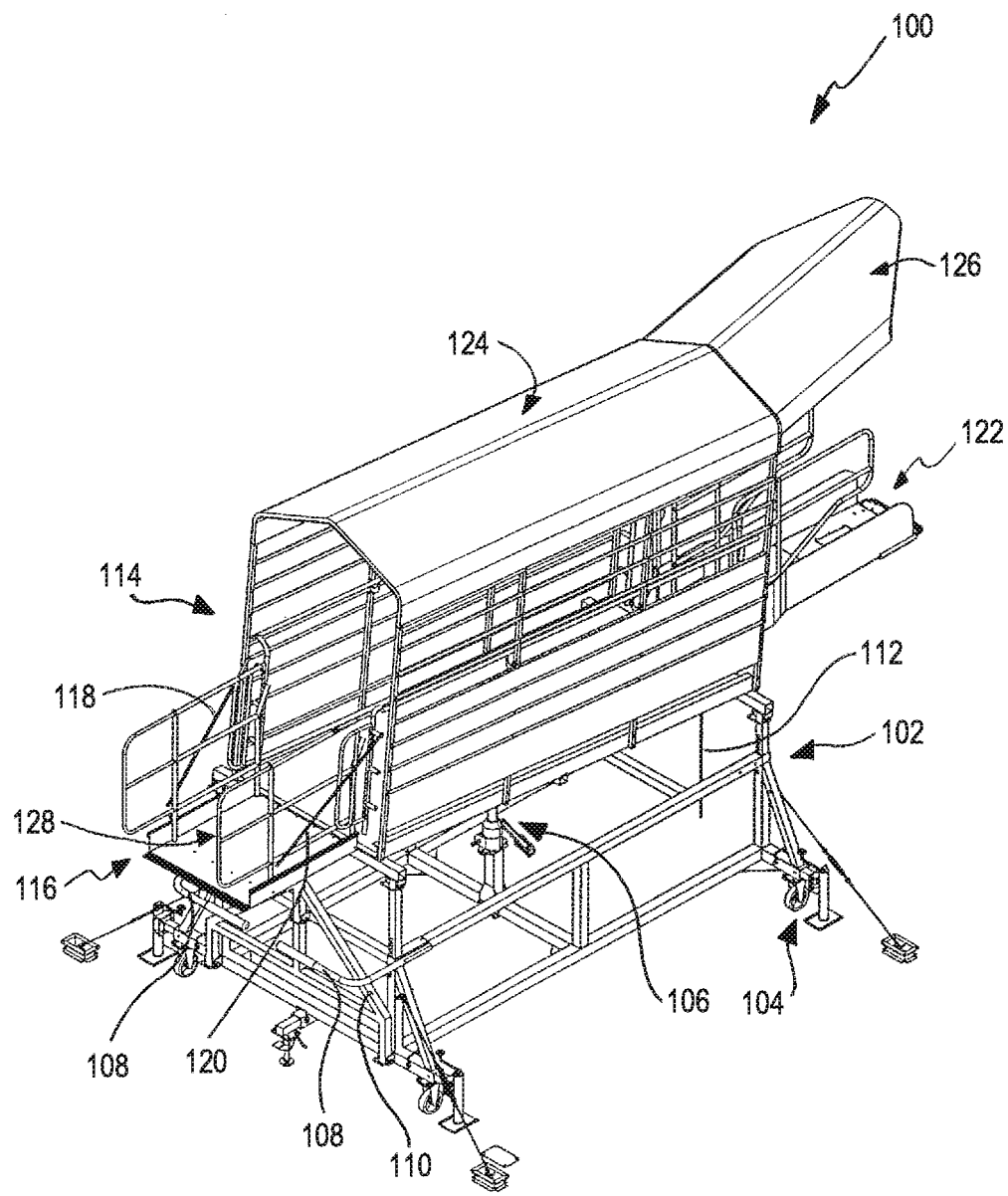
FIG. 1 illustrates an example apparatus to interface a boarding bridge and an airplane.

FIG. 1 illustrates an example apparatus 100 to interface a boarding bridge and an airplane (e.g., low doorsill airplane). The apparatus 100 includes a lower-frame assembly 102, an upper-frame assembly 114, a bridge gangplank assembly 116, and an airplane gangplank assembly 122. The apparatus 100 can be made of any metal (e.g., aluminum), a combination of metals (e.g., aluminium, steel), as well as other materials (e.g., vinyl, rubber).

The lower-frame assembly 102 is a generally tubular structure (e.g., square cross-section) that supports the upper-frame assembly 114, the bridge gangplank assembly 116, and the airplane gangplank assembly 122. The lower-frame assembly 102 includes caster-wheel assemblies 104, a jack assembly 106, push-bars 108, and a tow-bar 110. The lower-frame assembly 102 will be described in greater detail below with reference to FIG. 4.

The caster-wheel assemblies 104 are disposed at the corners of the lower-frame assembly 102 to facilitate movement (e.g., stowing and/or retrieving) of the apparatus 100 and maneuvering of the apparatus 100 in relation to the boarding bridge and airplane, facilitating the interface of these structures during the use of the apparatus (e.g., setup). Specifically, the lower-frame assembly 102 can include two (2) fixed caster-wheel assemblies, e.g., in the front (aircraft end), and two (2) swivel caster-wheel assemblies, e.g., in the rear (bridge end). It should be noted that all caster-wheel assemblies 104 can also be of the swivel type. The caster-wheel assembly 104 will be described in greater detail below with reference to FIG. 3.

The jack assembly 106 is approximately centrally disposed with respect to the lower-frame assembly 102 and facilitates the adjustment of the vertical height of the upper-frame assembly 114 and the gangplank assemblies 116, 122 with respect to the lower-frame assembly 102, as may be necessary to dock with airplanes having different doorsill heights as well as with boarding bridges having different deck heights. The jack assembly 106 will be described in greater detail below with reference to FIG. 4

The push-bars 108 facilitate ground personnel in manually pushing or pulling the apparatus 100, e.g., for interfacing with the boarding bridge and/or the airplane, as well as for stowing and/or retrieving. The push-bars 108 can be secured firmly to various locations of the lower-frame assembly 102, e.g., side sections shown in FIG. 1 or middle section shown in FIG. 4. The push-bars 108 project out a distance from the periphery of the lower-frame assembly 102 to provide ground personnel with sufficient clearance for moving and/or adjusting the apparatus 100.

The tow-bar 110 facilitates attachment of the apparatus 100 to a mechanised device for towing the apparatus 100, e.g., stowing and/or retrieving. The tow-bar 110 is pivotably secured to the lower-frame assembly 102, such that the tow-bar 110 can be folded during operation of the apparatus 100, and unfolded during towing. The tow-bar 110 will be described in greater detail below with reference to FIG. 2.

The upper-frame assembly 114 is generally a tubular structure (e.g., square cross-section) that connects the bridge gangplank assembly 116 and the airplane gangplank assembly 122, providing canopy sections 124, 126 for a covered passenger platform or walkway 128 that interfaces the boarding bridge and the airplane. A part of the upper-frame assembly 114, such as the canopy sections 124, 126, can be covered with vinyl (or another durable and weather-impermeable material) to mitigate the effects of weather (e.g., sun, rain, snow). A proximity post 112 (described in greater detail with reference to FIGS. 12A and 12B) is secured to the upper-frame assembly 114 in the front (aircraft end) as a guide for the proximity of the apparatus 100 to the airplane, to facilitate positioning of the apparatus 100 during operation. The upper-frame assembly 114 will be described in greater detail below with reference to FIGS. 5A-5C.

The bridge gangplank assembly 116 is pivotably secured to the upper-frame assembly 114 to connect the upper-frame assembly 114 to the boarding bridge. The bridge gangplank assembly 116 includes torsion springs 118, 120 to assist in raising and lowering the bridge gangplank assembly 116 with respect to the upper-frame assembly 114 to the boarding bridge. The bridge gangplank assembly 116 can have different structures (e.g., adjustable flap) as will be described in greater detail below with reference to FIGS. 6A and 6B.

The airplane gangplank assembly 122 is articulably secured to the upper-frame assembly 114 to connect the upper-frame assembly 114 to the airplane. Specifically, the airplane gangplank assembly 122 is pivotable with respect to the upper-frame assembly 114, providing zero-balance pivotability to assist in raising and lowering the airplane gangplank assembly 122 with respect to the upper-frame assembly 114 to the airplane. The airplane gangplank assembly 122 also swivels side-to-side to assist in fine tuning the positioning of the airplane gangplank assembly 122 with respect to the airplane doorsill and handrails. The airplane gangplank assembly 122 will be described in greater detail below with reference to FIGS. 7A, 7B and 8.

Figure 2:
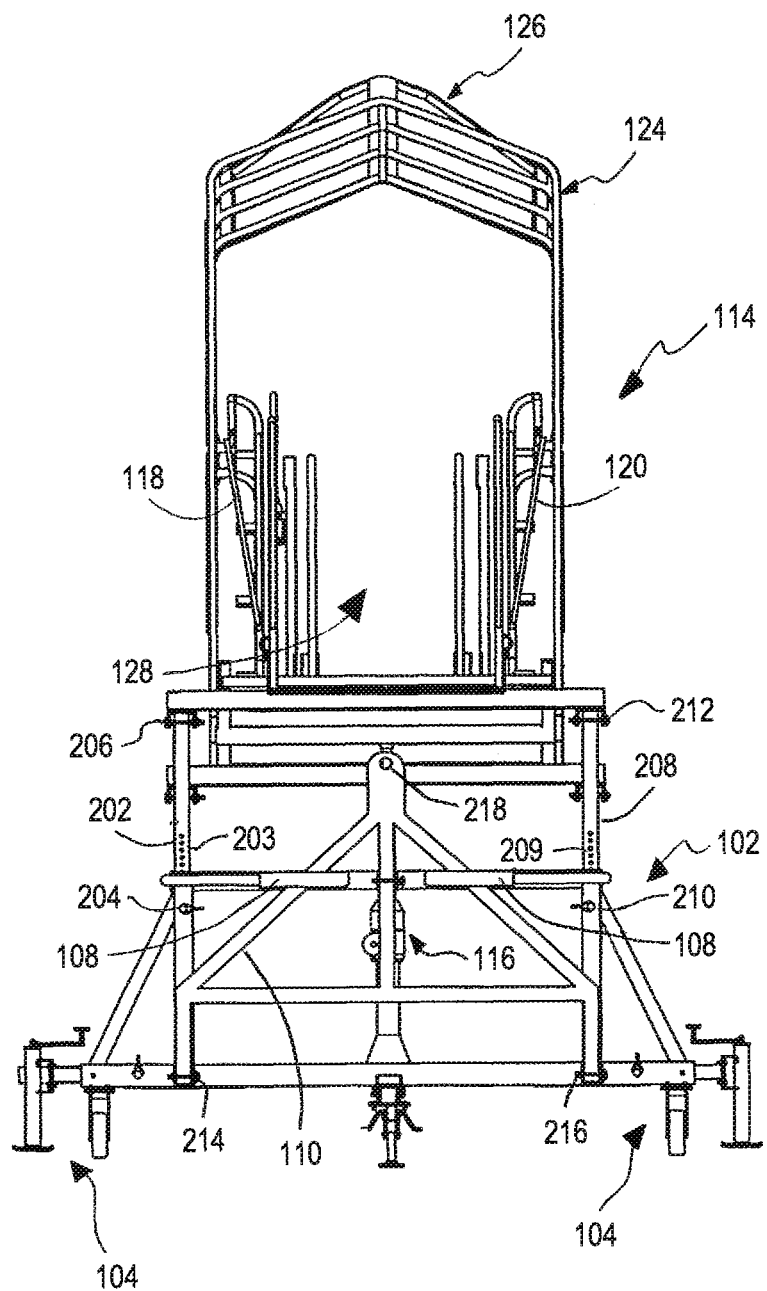
FIG. 2 illustrates a bridge end of the apparatus of FIG. 1.

FIG. 2 illustrates the rear (bridge end) of the apparatus 100. As shown, the lower-frame assembly 102 is secured adjustably to the upper-frame assembly 114 at the corners thereof with tubular posts (e.g., square cross-section). For example, a post 202 secures to the lower-frame assembly 102 by locking pin 204 and to the upper-frame assembly 114 by a locking pin 206. The post 202 includes a plurality of positions 203 (e.g., holes for pin 204) for adjusting the height of the upper-frame assembly 114 with respect to the lower-frame assembly 102.

Similarly, a post 208 secures to the lower-frame assembly 102 by a locking pin 210 and to the upper-frame assembly 114 by a locking pin 212. The post 208 also includes a plurality of positions 209 (e.g., holes for pin 210) for adjusting the height of the upper-frame assembly 114 with respect to the lower-frame assembly 102. It should be noted that the front (aircraft end) of the apparatus 100 includes similarly adjustable construction (e.g., posts secured by locking pins), as will be described in greater detail with reference to FIG. 9.

The tow-bar 110 is pivotably secured to c-shaped brackets of the lower-frame assembly 102 by locking pins 214, 216, such that the tow-bar 110 can be folded and unfolded during operation and towing of the apparatus 100, respectively.

Figure 3:
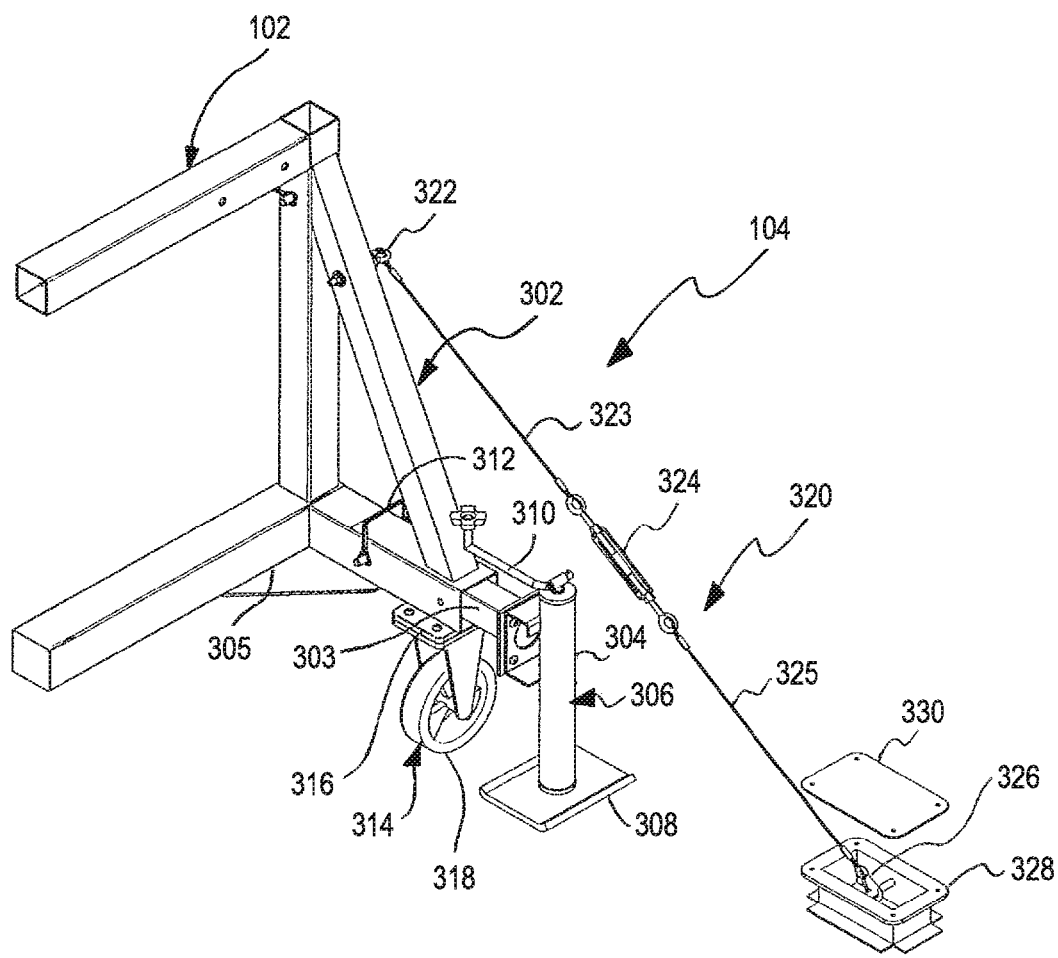
FIG. 3 illustrates an example caster-wheel assembly of the apparatus of FIG. 1.

FIG. 3 illustrates an example caster-wheel assembly 104. As shown, the caster-wheel assembly 104 is disposed at a corner of the lower-frame assembly 102 to facilitate movement (e.g., stowing and/or retrieving) of the apparatus 100 and maneuvering of the apparatus 100 in relation to the boarding bridge and airplane during operation of the apparatus. As described earlier, four (4) such caster-wheel assemblies are provided. The caster-wheel assembly 104 includes a structure 302, a stabilizer assembly 306, a wheel assembly 314, and optionally, a retention assembly 320.

The structure 302 is tubular (e.g., square cross-section) and extends from the periphery of the lower-frame assembly 102 to form a right triangle with respect to the lower-frame assembly 102. The structure 302 is reinforced to the lower-frame assembly 102 with a plate 305. Alternate shapes for the structure 302 are of course possible, such as an equilateral structure (e.g., rectangular).

The stabilizer assembly 306 is secured to a post 303, which is secured to the structure 302 by a locking pin 312. The stabilizer assembly 306 includes a stabilizer jack 304, a ground plate 308, and a handle 310. A c-shaped flange secured to a terminal end of the post 303 connects the post 303 to the stabilizer stabilizing jack 304 of the stabilizer assembly 306. During operation, the rotation of the handle 310 (clockwise) extends or (counter-clockwise) retracts the plate 308 in relation to the ground.

Accordingly, the stabilizer assembly 306 at each corner of the lower-frame assembly 102 prevent the apparatus 100 from being moved out of place inadvertently when the apparatus 100 is positioned in relation to an airplane. Similarly, the stabilizer assemblies 306 can also be used to prevent the apparatus 100 from moving during windy weather when the apparatus 100 is stowed.

The wheel assembly 314 includes a caster bracket 316 and a caster wheel 318. The caster bracket 316 is secured to the bottom of the structure 302. The caster wheel 318 is rotationally secured to the caster bracket 316. The caster bracket 316 can be articulable, such that it can swivel in relation to the structure 302, or it can be fixed in relation to the structure 302. As described herein, two (2) fixed-wheel assemblies 314 can be provided in the front (aircraft end) and two (2) swivel-wheel assemblies 314 can be provided in the rear (bridge end). Alternatively, all wheel assemblies 314 can be of the swivel type.

The retention assembly 320 can facilitate a stronger connection of the apparatus 100 to the ground. The retention assembly 320 includes an eyebolt 322, wire segments 323, 325, a turnbuckle 324, and a snap hook 326. The eyebolt 322 is secured to a section of the structure 302. Wire segments 323, 325 connect the eyebolt 322 to the turnbuckle 324 and the snap hook 326, respectively. The snap hook 326 can connect the retention assembly 320 to a bracket 328 mounted in the ground. When bracket 328 is not in use it can be covered by a cover 330.

Figure 4:
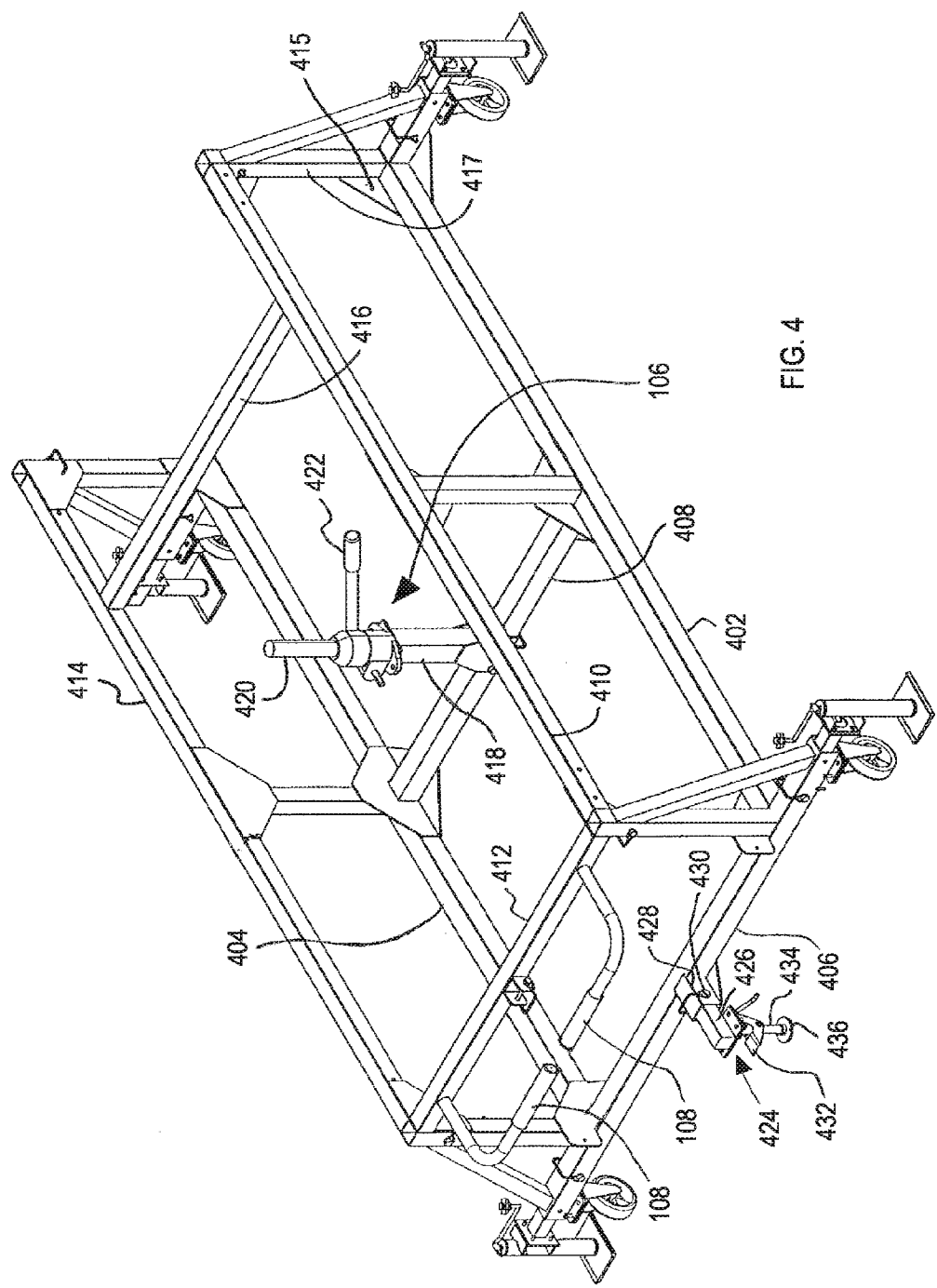
FIG. 4 illustrates an example lower-frame assembly of the apparatus of FIG. 1.

FIG. 4 illustrates an example lower-frame assembly 102. The lower-frame assembly 102 includes a first frame member having tubular segments (e.g., square cross-section) 402-408, and a second frame member having tubular segments (e.g., square cross-section) 410-416. The first frame member and the second frame member are connected by tubular segments (e.g., square cross-section) 417 and reinforced by plates 415 to form the lower-frame assembly 102.

The jack assembly 106 is approximately centrally disposed with respect to the lower-frame assembly 102 and is connected to the tubular segment 408 of the first frame member. The jack assembly 106 is a hydraulic jack that includes a base 418, a post 420 and a handle 422. The post 420 (a portion of which is shown in FIG. 4) is connected to the upper-frame assembly 114, which is described in greater detail below with reference to FIG. 9. It is noted that the jack assembly 106 can be a different type of jack, e.g., a mechanical jack.

In operation, the depression of the handle 422 causes the post 420 to extend with respect to the base 418 to adjust the vertical height of the upper-frame assembly 114 and connected gangplank assemblies 116, 122 with respect to the lower-frame assembly 102, as may be necessary to dock with airplanes having different doorsill heights. A valve (not shown) of the jack assembly 106 can be opened in order to lower the post 420 with respect to the base 418 to adjust the vertical height of the upper-frame assembly 114 and connected gangplank assemblies 116, 122 with respect to the lower-frame assembly 102.

The lower-frame assembly 102 can further include a tubular segment 428 to connect a pedal jack assembly 424 using a tubular section 426 and a locking pin 430. The pedal jack assembly 424 includes a pedal jack 432, a ground plate 436, and a post (e.g., round cross-section) 434. During operation, stepping on the pedal jack 432 extends the post 434 toward to the ground, causing the plate 436 to contact or engage the ground. The pedal jack assembly 424 can temporarily fixate or stabilize the initial position of the apparatus 100, which offers sufficient initial stability to deploy other stabilizer assemblies 306.

FIGS. 5A-5C illustrate an example upper-frame assembly 114. The upper-frame assembly 114 includes tubular support sections 502-506, deck sections 508, 520, tunnel structure 510, handrails 516, 518, connection device 522, and c-shaped channels 528, 530.

The terminal tubular support sections 502, 506 support the upper-frame assembly 114 and connect the upper-frame assembly 114 to the lower-frame assembly 102 using posts 202, 208, 902, 908, as shown in FIGS. 2 and 9, for example. Moreover, the middle tubular support section 504 supports upper-frame assembly 114 and connects the upper-frame assembly 114 to the lower-frame assembly 102 using the jack assembly 106, as shown in FIG. 9, for example.

The deck sections 508, 520 extend along the c-shaped channels 528, 530 between the terminal tubular support sections 502, 506. The deck section 508 slopes down from a highest point between the c-shaped channels 528, 530, at the terminal tubular support section 502, toward a lowest point between the c-shaped channels 528, 530, as indicated by demarcation 521 where the deck sections 508, 520 meet. Thus, the deck section 520 is at an angle with respect to the deck section 508. Specifically, the deck section 520 is intended to be approximately parallel to the ground, while deck section 508 slopes down toward the deck section 520. The c-shaped channels 528, 530 are secured to the tubular support sections 502, 506.

The tunnel structure 510 includes tubular sections 512, 514. The tubular sections 512 are of an arcuate shape, while tubular sections 514 are straight. The tubular sections 512 are spaced apart from each other and are connected to the c-shaped channels 528, 530 in an upright manner, e.g., with terminal ends of the tubular sections 512 being secured to the c-shaped channels 528, 530. The tubular sections 514 are also spaced apart from each other and secured to the tubular sections 512 in a transverse orientation to form a tunnel shape.

A material (e.g., vinyl) is secured to a top portion of the tunnel structure 510 to form the canopy 124 (FIG. 5B). Additionally, a material (e.g., vinyl) can also be secured to tubular sections 514 along one or more sections of the tunnel structure 510, as indicated by sections 532, 534 (FIG. 5B). For example, in some embodiments the entire tunnel structure 510 can be covered. Covered sections of the tunnel structure 510 prevent weather (e.g., rain, snow) from entering the tunnel structure 510, while open sections allow light into the tunnel structure 510. It should be noted that some or all of the tunnel structure 510 can be covered with a translucent material, allowing light to penetrate while also preventing weather from entering the tunnel structure 510. Various covered sections can be opaque or translucent, varying the areas and amounts of light penetrating into the tunnel structure 510.

The handrails 516, 518 are secured to the deck sections 508, 520 and also to the tubular sections 512 of the tunnel structure 510. The handrails 516, 518 provide passengers with support as they travel along the deck sections 508, 520.

The connection device 522 is integrated into the deck section 520 to facilitate mating and articulation of the airplane gangplank assembly 122 with respect to the upper-frame assembly 114, as will be described in greater detail below with reference to FIGS. 10 and 11. The connection device 522 includes stacked flange bearings 524 surrounded by ball bearings 526.

Figure 6A:
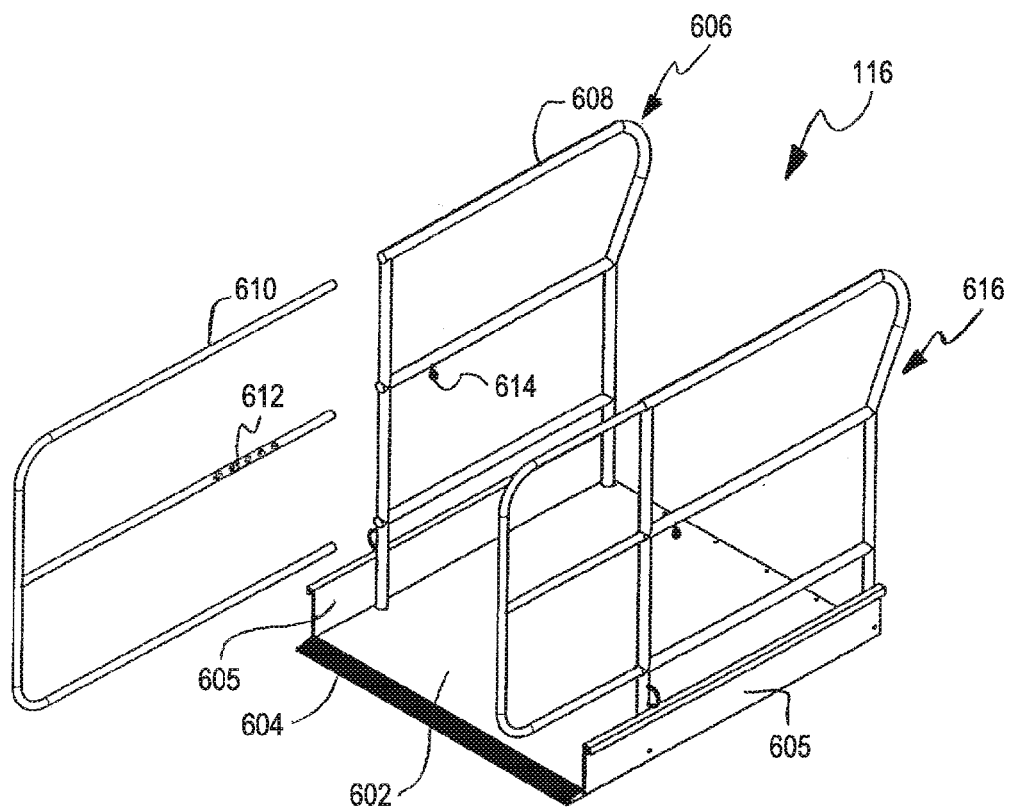
FIG. 6A illustrates an example bridge gangplank assembly of the apparatus of FIG. 1.

FIG. 6A illustrates an example bridge gangplank assembly 116. The bridge gangplank assembly 116 includes a deck 602 and telescoping handrails 606, 616. The deck 602 has a rubberized threshold 604 and borders 605. The rubberized threshold 604 extends along the width of the deck 602, while the borders 605 extend at least partially along the length of the deck 602.

The telescoping handrails 606, 616 are secured to the deck 602 and the borders 605. The telescoping handrails 606, 616 include a first section 608 and a telescoping second section 610. The second section 610 includes a plurality of positions (e.g., openings) 612 for adjusting the length of the second section 610 with respect to the first section 608. A spring pin 614 secures the second section 610 to the first section 608 at one of the positions 612.

Figure 6B:
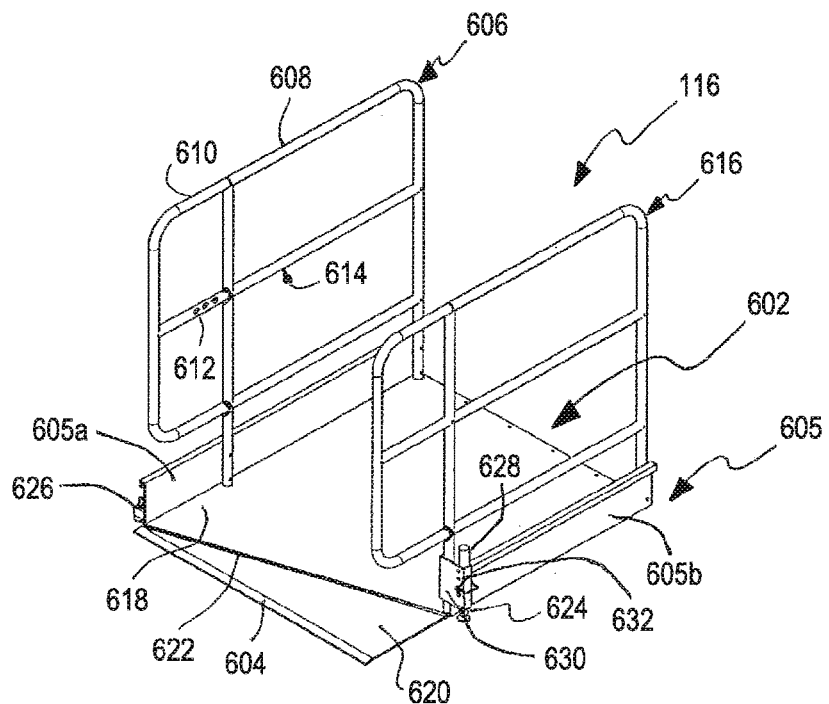
FIG. 6B illustrates another example bridge gangplank assembly of the apparatus of FIG. 1.

FIG. 6B illustrates another example of a bridge gangplank assembly 116. The bridge gangplank assembly 116 is similar to that illustrated in FIG. 6A, except that the deck 602 has two (2) deck sections 618 and 620 secured by a hinge 622. The deck sections 618, 620 are angled as shown, providing articulation sufficient to mate smoothly (without a tripping hazard) with a deck of the boarding bridge that is tilted sideways, as some boarding bridges do not have a leveling feature. Accordingly, the borders 605 are of uneven lengths, including a border 605a that is longer than the border 605b. This enables the bridge gangplank assembly 116 to interface a tilted boarding bridge, thereby providing a smooth and unobstructed passageway to the passengers between the boarding bridge and the apparatus 100.

Moreover, this example of the bridge gangplank assembly 116 includes adjustable levelers 624, 626 that can be adjusted to mate with the walking surface of the tilted boarding bridge. The adjustable levelers 624, 626 include a post 628 having a terminal plate (e.g., round plate), a bracket 630 having multiple level positions, and a locking pin 632. The post 628 can be moved vertically in relation to the bracket 630 and locked in a desirable position by the locking pin 632, e.g., in which the terminal plate contacts the walking surface of the boarding bridge.

FIGS. 7A-8 illustrate an example airplane gangplank assembly 122. The airplane gangplank assembly 122 includes handrails 702, 704, turntable 706, deck sections 708, 710, 712, and latching mechanism 714.

The airplane gangplank assembly 122 is wider at the interface with the upper-frame assembly 114 and narrower at the interface with the airplane doorsill, as particularly shown in FIGS. 7A and 7B. The handrails 702, 704 are thus secured to the deck section 710 (at its wide part) and extend approximately along the narrower borders 705.

The turntable 706 is disposed approximately flush with the deck section 708 and includes a shaft (e.g., round cross-section) 802 that extends through the deck section 708, as particularly shown in FIG. 8. The shaft 802 is received through the stacked flange bearings 524 and the deck section 708 is disposed atop the ball bearings 526 (FIGS. 5A-5C), as will be described in greater detail with reference to FIGS. 10 and 11. This enables the airplane gangplank assembly 122 to swivel side-to-side in order to assist in positioning the airplane gangplank assembly 122 with respect to the airplane doorsill and handrails.

The deck section 710 is secured to a frame 711. Moreover, the deck section 710 is secured to the deck section 708 by a hinge 709, allowing the deck section 710 (with frame 711) to pivot in respect to the deck section 708. Specifically, the frame 711 includes strut assemblies 716, which enable zero-balance pivotability of the deck section 710 (with frame 711) to assist in raising and lowering the airplane gangplank assembly 122 with minimal application of force. The strut assemblies 716 are secured to strut support brackets 722 (e.g., triangular) and the elongate members 720 of the frame 711.

The deck section 710 includes a first portion 710a and a second portion 710b that is at an angle with respect to the first portion 710a (e.g., sloping down toward the airplane). Similarly, the frame 711 includes a first section 724 and a second sloping section 726 (e.g., sloping down toward the airplane).

The latching mechanism 714 allows engagement/disengagement of the pin 715 with a reciprocal device 718 (having an opening) disposed on the outside of the border 705 to allow the airplane gangplank assembly 122 to be folded/retained securely for stowing/maneuvering and to be opened during operation.

The deck section 712 is secured to the frame 711 approximately flush with the deck section 710. Rubberized thresholds 728, 730 are provided at edges of the deck sections 708, 712, respectively, to provide for secure passageway of the passengers.

FIG. 9 illustrates connection of the lower frame assembly 102 to the upper-frame assembly 114.

As shown, the lower-frame assembly 102 is secured adjustably to the upper-frame assembly 114 at the corners thereof with tubular posts (e.g., square cross-section). For example, posts 202, 208, 902, 908 secure to the lower-frame assembly 102 by respective locking pins 204, 210, 904, 910 and to the upper-frame assembly 114 by respective locking pins 206, 212, 906, 912. As shown, the posts 202, 208, 902, 908 include a plurality of positions for adjusting the height of the upper-frame assembly 114 with respect to the lower-frame assembly 102, as described hereinabove with reference to FIG. 3.

As further shown, the base 418 of the jack assembly 106 is approximately centrally disposed with respect to the lower-frame assembly 102 and is connected to the tubular segment 408 of the lower-frame assembly 102. A bracket 916 is secured to the underside of the tubular support section 504 of the upper-frame assembly 114. The post 420 of the jack assembly 106 includes a narrower post section 914 that is connected to the bracket 916 by a locking pin 918. This connection enables the raising or lowering of the upper-frame assembly 114 unevenly with respect to the lower-frame assembly 102 (e.g., bridge side being higher than airplane side), as may be necessary to interface a certain boarding bridge with a certain airplane.

Figure 10:
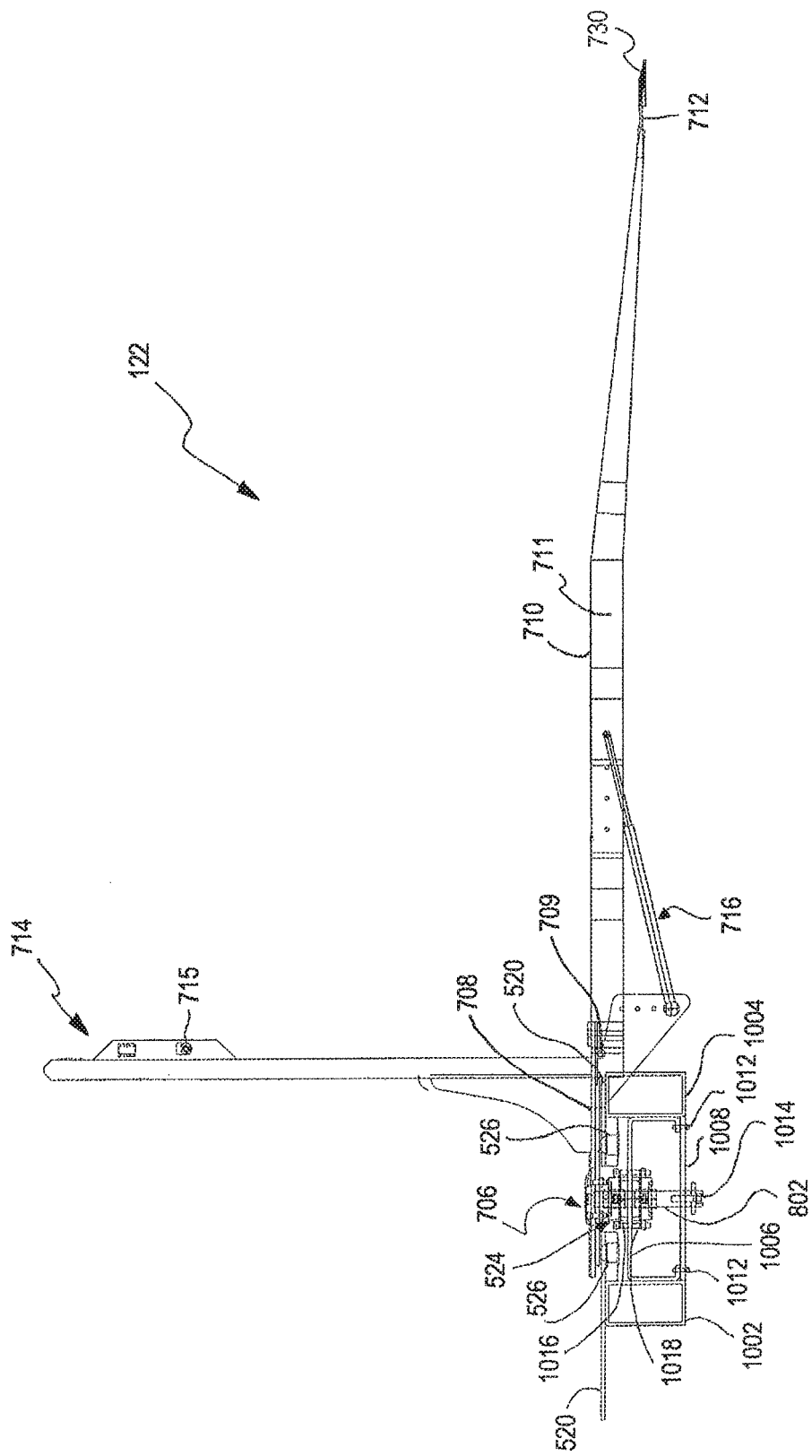
FIGS. 10 and 11 illustrate the integration of the airplane gangplank assembly with the upper-frame assembly of the apparatus of FIG. 1.
Figure 11:
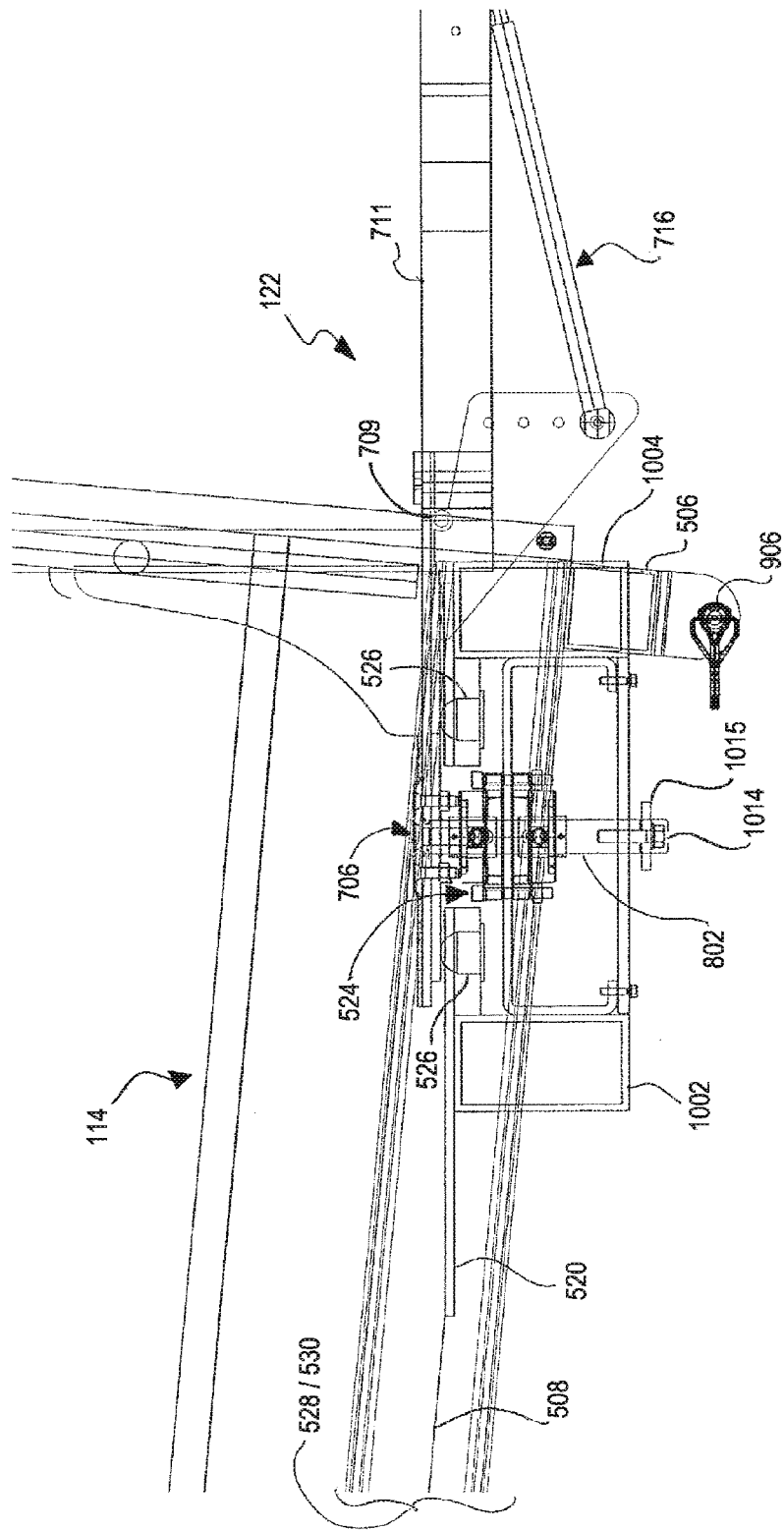

FIGS. 10 and 11 illustrate the integration of the airplane gangplank assembly 122 with the upper-frame assembly 114. A cross-section of the airplane gangplank assembly 122 and the upper-frame assembly 114 is shown to aid in understanding the integration of these components.

Tubular frame members (e.g., rectangular cross section) 1002, 1004 are spaced apart and extend crosswise to the deck section 520. Moreover, the frame members 1002, 1004 are secured to the deck section 520 above and to the c-shaped channels 528, 530 at the sides (FIGS. 5A-5C). Extending between the frame members 1002, 1004 is a flange bearing support 1006, which is secured to the frame members 1002, 1004. The flange bearing support 1006 is c-shaped. The flange bearing assembly 524 includes a first flange bearing 1016 that is disposed on top the flange bearing support 1006 and a second flange bearing 1018 that is disposed on the underside of the flange bearing support 1006. The flange bearings are secured to one another through the flange bearing support 1006. A plate 1008 is secured to the flange bearing support 1006 with bolts 1012 to enclose the flange bearing support 1006.

The deck section 708 is disposed in swivelable contact with the ball bearing 526, and the turntable 706 is disposed approximately flush with the deck section 708. The shaft 802 extends from the turntable 706 through the deck section 708, through the flange bearing support 1006, through the flange bearings assembly 524, and further through the plate 1008. A disk 1015 is secured to the shaft 802 by the flange screw 1014. This prevents the airplane gangplank assembly 122 from disconnecting from the upper-frame assembly 114, while enabling the airplane gangplank assembly 122 to swivel side-to-side with respect to upper-frame assembly 114.

Figures 12A, 12B:
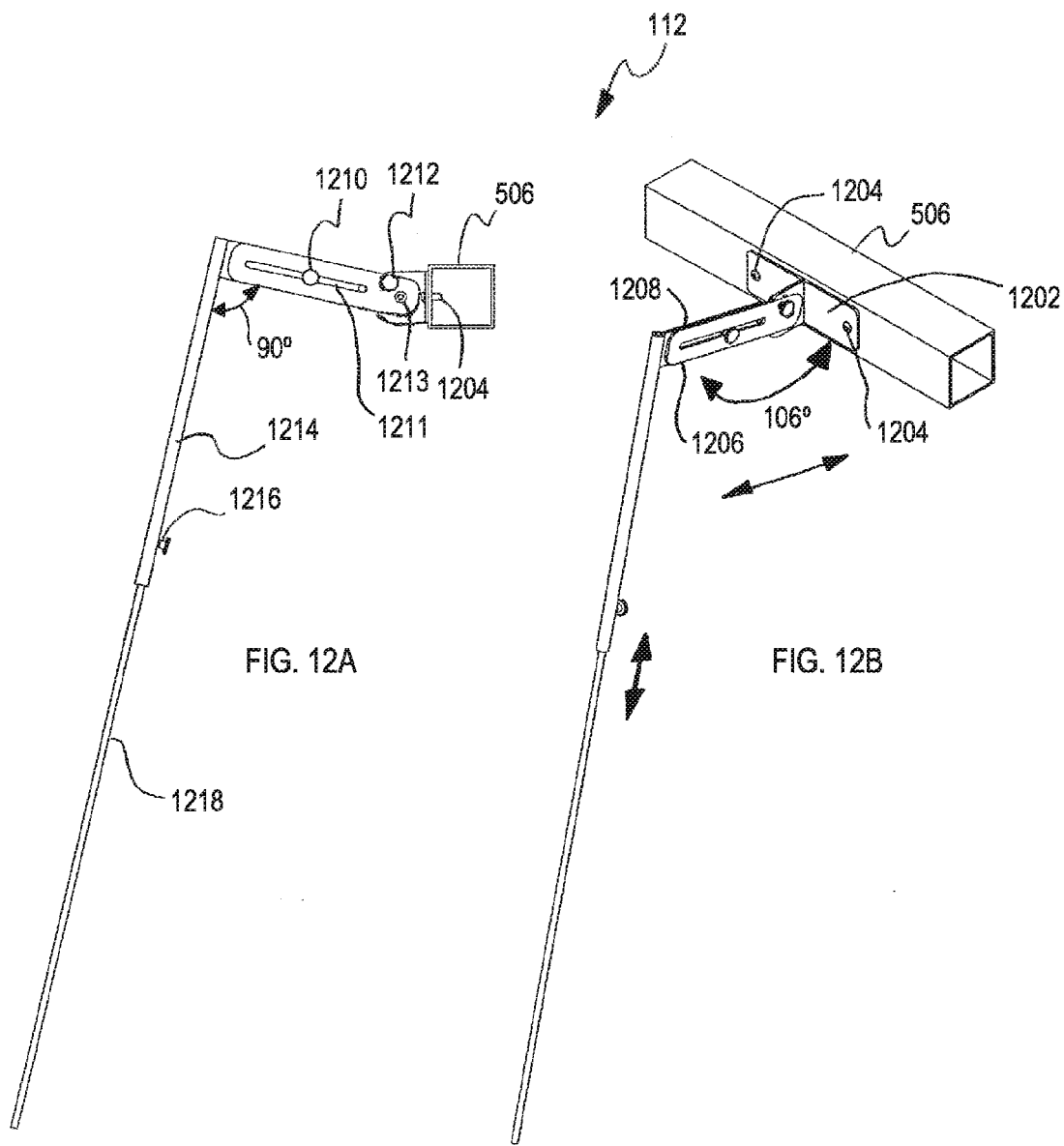
FIGS. 12A and 12B illustrate an example proximity post of the apparatus of FIG. 1.

FIGS. 12A and 12B illustrate an example proximity post 112. The proximity post 112 is secured to the tubular support sections 506 of the upper-frame assembly 114 (aircraft end) as a guide for the proximity of the apparatus 100 in respect to the airplane, to facilitate positioning of the apparatus 100 during operation.

Retention plate 1202 secures the proximity post 112 to the tubular support section 506 of the upper-frame assembly 114 using screws 1204, for example. The proximity post 112 includes two elongated plates 1206, 1208 that are slideably engaged by a riveting pin 1210 through respective channels 1211. Elongated plate 1206 is pivotably secured to the retention plate 1202 by a rivet 1213 and can be secured in one or more pivotable positions by detent 1212.

Accordingly, the proximity post 112 (elongated plates 1206, 1208) can extend from and pivot in relation to the support section 506. The proximity post 112 further includes extensible arm 1214, which is secured to the elongated plate 1208. The extensible arm 1214 includes a telescoping section 1218. A screw 1216 can secure the telescoping section 1218 in one of many extended position with respect to the extensible arm 1214. This provides multiple proximity sensing positions for the proximity post 112.

Figure 13:
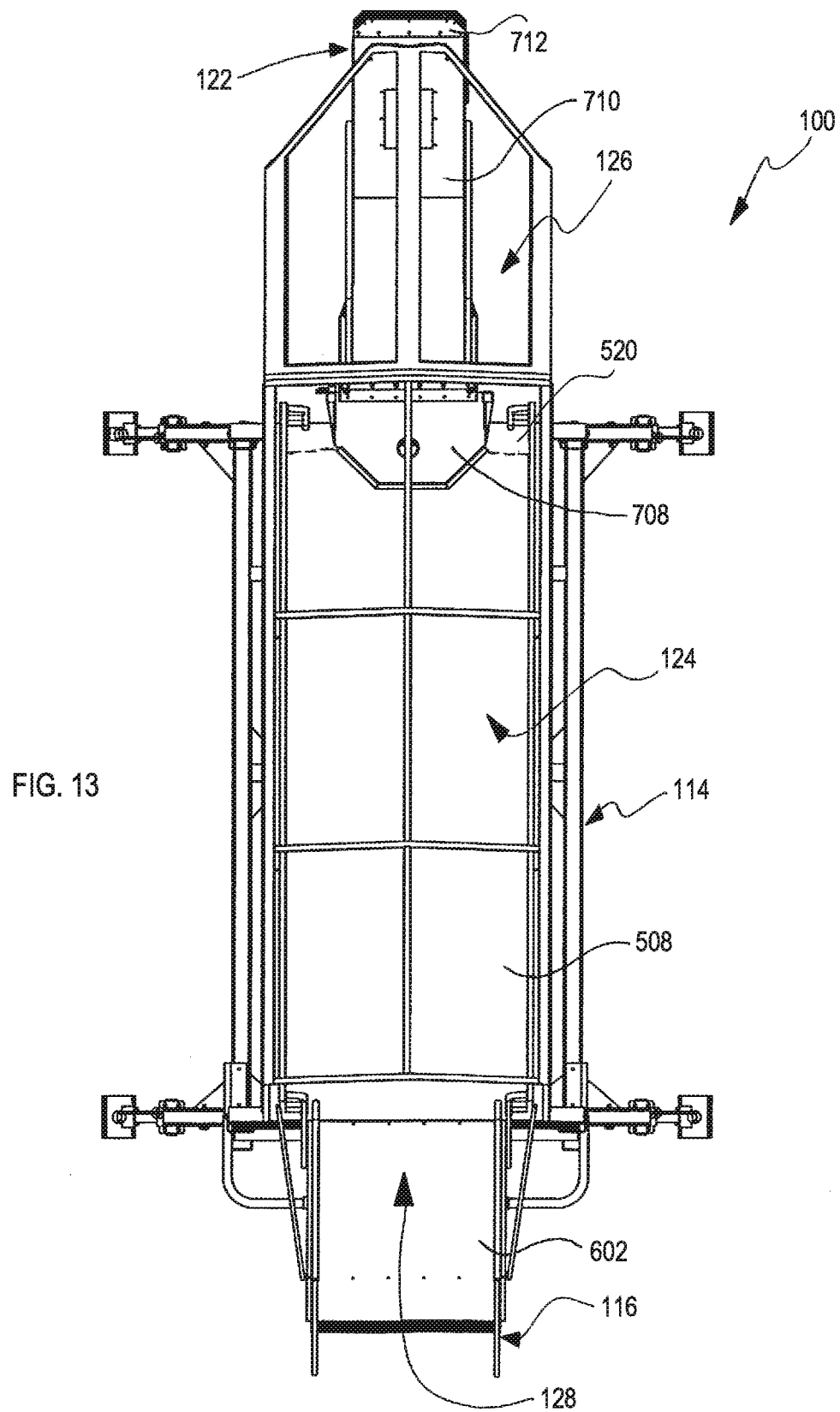
FIG. 13 illustrates a top view of the apparatus of FIG. 1 extended during operation.

FIG. 13 illustrates a top view of the apparatus 100 extended during operation.

As shown, the passenger platform or walkway 128, which includes decks 602, 508, 520, 708, 710, 712, interfaces the boarding bridge and the airplane, as will be described in greater detail below with reference to FIGS. 14 and 15. Moreover, the canopy sections 124, 126 mitigate the effects of weather (e.g., sun, rain, snow).

Figure 14:
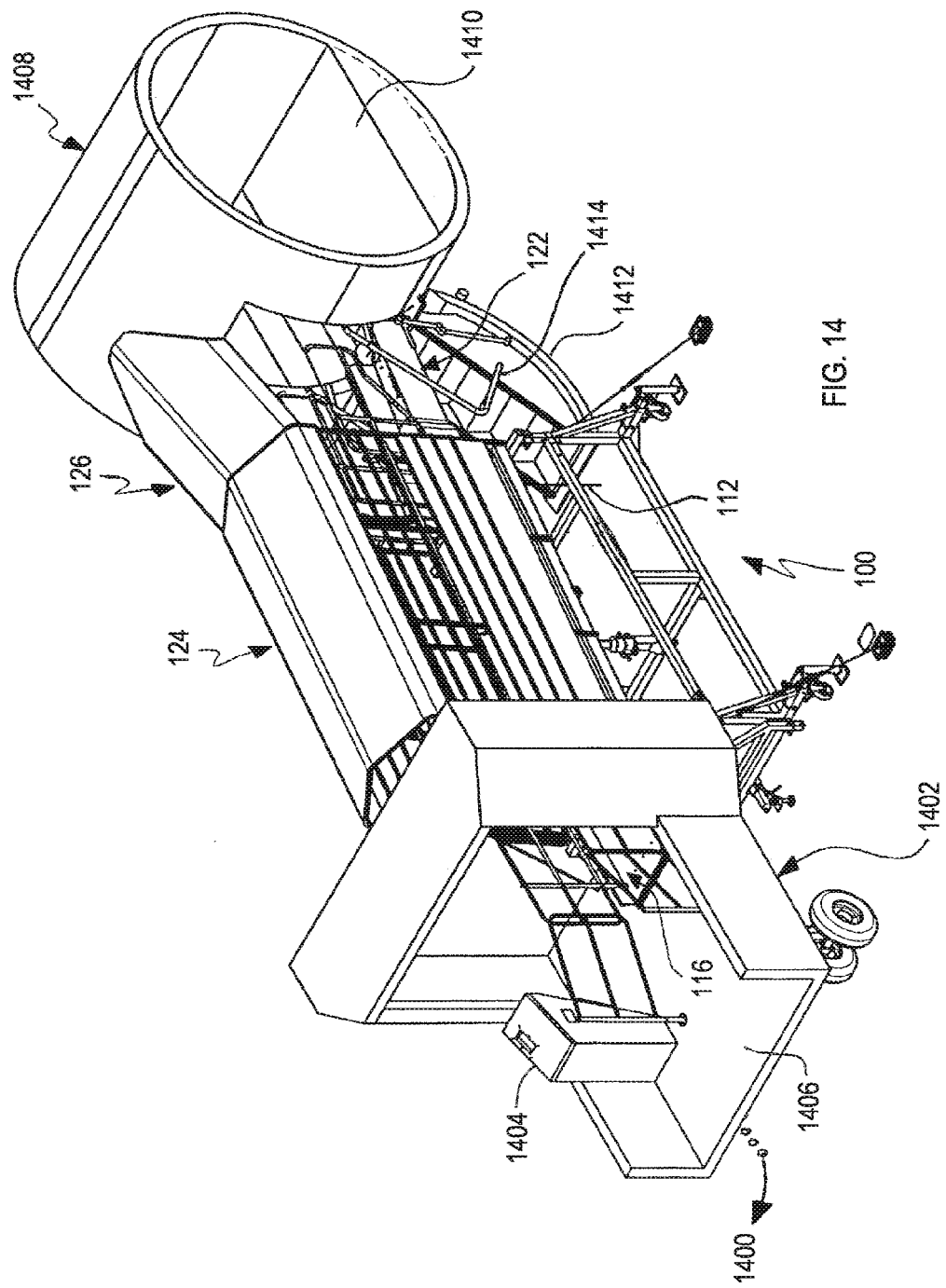
FIG. 14 illustrates side view of the apparatus of FIG. 1 extended during operation to interface a boarding bridge and an airplane.

FIG. 14 illustrates a side view of the apparatus 100 extended during operation to interface a boarding bridge 1402 (cab section) and an airplane 1408. It is noted that only a cab section of the boarding bridge 1402 is shown for clarity. It is understood that the boarding bridge 1402 includes telescoping tunnel sections (not shown) and a rotunda (not shown) connecting the boarding bridge 1402 to the gate 1400 of the airport terminal.

The cab section of the boarding bridge 1402 includes a control station 1404 to adjust the boarding bridge 1402 with respect to apparatus 100, such that the apparatus 100 can interface the boarding bridge 1402 and the airplane 1408. As shown, the walkway 128 of the apparatus 100 (FIGS. 1 and 13) interfaces the deck 1406 of the boarding bridge 1402 and the deck 1410 of the airplane 1408. More specifically, the bridge gangplank assembly 116 is disposed atop the deck 1406 of the boarding bridge 1402, and the airplane gangplank assembly 122 is disposed atop the airplane deck 1410 of the airplane 1408 and between the handrails 1414 of the airplane staircase 1412.

Figure 15:
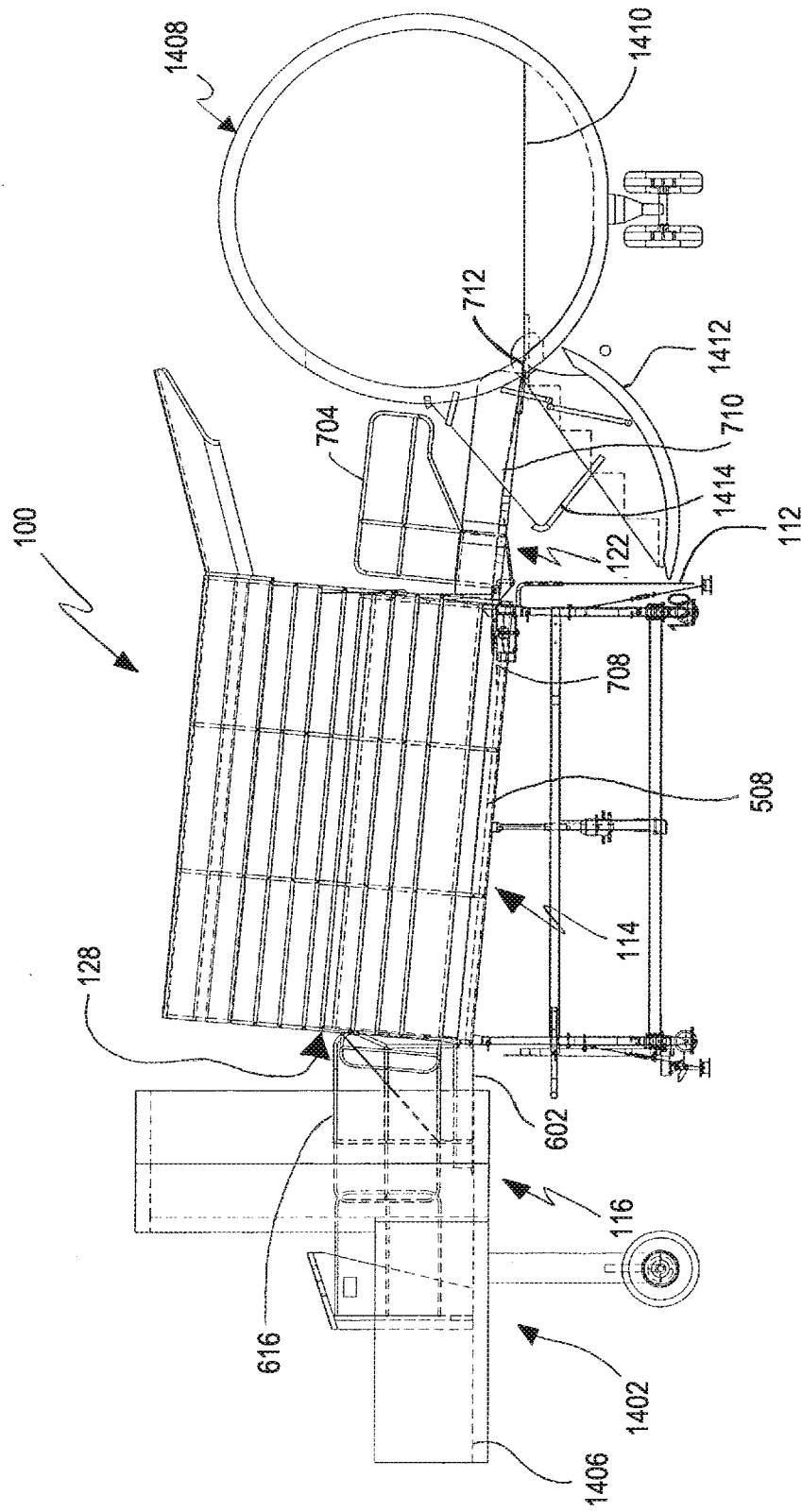
FIG. 15 illustrates side cross-sectional view of the apparatus of FIG. 14 extended during operation to interface the boarding bridge and the airplane.

FIG. 15 illustrates side cross-sectional view of the apparatus 100 extended during operation to interface the boarding bridge 1402 and the airplane 1408.

As shown, the deck 1406 of the boarding bridge 1402 interfaces the deck 602 (bridge gangplank assembly 116) of the walkway 128. Moreover, the deck 710 (airplane gangplank assembly 122) of the walkway 128 interfaces the deck 1410 of the airplane 1408. The walkway 128 includes the decks 602, 508, 520, 708, 710, 712, as described with reference to FIGS. 1 and 13.

The following briefly describes the operational characteristics and advantages of the apparatus 100 in interfacing the boarding bridge 1402 and the airplane 1408 during arrival and departure.

The apparatus 100 is a non-motorized piece of ground equipment that allows passengers to board and deplane from the airplane 1408 onto a boarding bridge 1402. Moreover, the apparatus 100 provides a safe and secure walkway or passageway 128 for passengers to enter or exit the boarding bridge 1402 and seamlessly connect the passengers to the comfort of a conventional second-level gate of a terminal.

The apparatus 100 is adjustable for connecting to different boarding bridges and is further adjustable for various airplanes (e.g., CR-J, EMB and SAAB 340). Specifically, the apparatus 100 provides the ability to adjust the vertical height at the front (aircraft end) and at the rear (bridge end). This is a useful feature for mating with various styles of boarding bridges and various airplanes. Specifically, the jack assembly 106 facilitates the adjustment of the vertical height of the upper-frame assembly 114 and the gangplank assemblies 116, 122 with respect to the lower-frame assembly 102, as may be necessary to dock with airplanes having different doorsill heights as well as with boarding bridges having different deck heights.

To adjust the vertical height of the apparatus 100 at the bridge end, the valve (not shown) of the jack assembly 106 is closed securely. The handle 422 of the jack assembly 106 is used to pump the jack slightly in order to relieve pressure on the pins 204, 210. The pins 204, 210 are removed once they become loose. The bridge end of the upper-frame assembly 114 and the bridge gangplank assembly 116 are raised or lowered to a desired height with respect to the lower-frame assembly 102 by using the jack assembly 106, e.g., pumping the handle 422 to raise, and opening the valve to lower. Once the holes (e.g., positions 203, 209) of the posts 202, 208 are aligned with the respective holes for the pins 204, 210 at the desired height, the pins 204, 210 are re-inserted to secure the posts 202, 208 to the lower-frame assembly 102.

A similar set of operations can be used to adjust the vertical height of the apparatus 100 at the front (aircraft end), whether approximately concurrently with adjustment at the bridge end or separately therefrom. If aircraft end is adjusted approximately concurrently with the adjustment at the bridge end, the pressure on the pins 904, 910 has thus been relieved using the jack assembly 106. If not, the operations to do so are performed as described hereinabove. The pins 904, 910 are removed once they become loose. The aircraft end of the upper-frame assembly 114 and the airplane gangplank assembly 122 are raised or lowered to a desired height with respect to the lower-frame assembly 102 by using the jack assembly 106, e.g., pumping the handle 422 to raise, and opening the valve to lower. Once the holes of the posts 902, 908 are aligned with the respective holes for the pins 904, 910 at the desired height, the pins 904, 910 are re-inserted to secure the posts 902, 908 to the lower-frame assembly 102.

The apparatus 100 further provides the passengers with protection from weather conditions during the boarding or deplaning, with passengers never having to climb or descend stairs to enter or exit the airplane 1408. Disabled or wheelchair-bound passengers can board and deplane without interruption or a separate lifting device, dramatically reducing the time required to complete boarding or deplaning. Because the apparatus 100 connects passengers directly to the boarding bridge 1402, fewer ground personnel are required for safety and security compliance as the passengers do not need to traverse an active tarmac.

During arrival, with the boarding bridge 1402 safely positioned away from the inbound airplane 1408, the apparatus 100 is rolled by ground personnel into a safe location near the cab of the boarding bridge 1402, making sure the apparatus 100 is also clear from the airplane 1408. Once the airplane has blocked-in and the engines are shut down, the cabin door/staircase 1412 is then deployed.

The apparatus 100 is then maneuvered into place by pushing push-bars 108 of the apparatus 100 (FIG. 1) in order to align the apparatus 100 approximately perpendicularly to the cabin of the airplane 1408 and at approximate proximity to the cabin door/staircase 1412. In this regard, the proximity post 112 of FIG. 1, set to a proximity sensing position described with reference to FIGS. 12A, 12B, is used to guide the apparatus 100 to the approximate proximity to the cabin door/staircase 1412 of the airplane 1408. The stabilizer assemblies 306 (FIG. 3) are then deployed to secure the position of the apparatus 100 with respect to the airplane 1408.

After the apparatus 100 is placed in the appropriate position with respect to the airplane 1408, the boarding bridge 1402 is driven by a gate agent using control station 1404 into position at the opposite side of the apparatus 100. When the boarding bridge 1402 is within a short distance (e.g., 1 meter) of the apparatus 100, the speed of the boarding bridge 1402 is reduced to a minimum, allowing the alignment with the apparatus 100. The alignment includes side-to-side alignment and vertical alignment. More specifically, the boarding bridge 1402 is stopped such that its bumper is touching or is within a close proximity of touching the apparatus 100.

With the boarding bridge 1402 in appropriate position and powered off, the gate agent walks over to the apparatus 100 and deploys the bridge gangplank assembly 116, lowering the bridge gangplank assembly 116 onto the boarding bridge deck 1406. In those cases where the boarding bridge 1402 is not leveled and the bridge gangplank assembly 116 includes deck sections 618, 620, the gate agent can also articulate deck section 620 and the levelers 624, 626 to interface the bridge gangplank assembly 116 with the boarding bridge deck 1406 of the boarding bridge 1402.

The gate agent further walks through the apparatus 100 to the airplane gangplank assembly 122 and deploys the airplane gangplank assembly 122. In order to deploy the airplane gangplank assembly 122, the gate agent depresses the latching mechanism 714 towards the airplane gangplank assembly 122. The latching mechanism 714 disengages the pin 715. While still depressing the latching mechanism 714, the gate agent pushes the airplane gangplank assembly 122 down toward the airplane. Once the airplane gangplank assembly 122 is within close proximity of the airplane 1408, the airplane gangplank assembly 122 is swiveled and further pushed to deploy the airplane gangplank assembly 122 between the handrails 1414 of the door/staircase 1412.

During departure, the gate agent walks through the apparatus 100 to the airplane gangplank assembly 122. The gate agent grabs the handles 702, 704 and pulls the airplane gangplank assembly 122 up and into the stowing position. Using the latching mechanism 714, the pin 715 is engaged to retain the airplane gangplank assembly 122 in the stowed position.

The gate agent further walks through the apparatus 100 to the boarding bridge 1402 and using rails 606, 616 of the bridge gangplank assembly 116 then raises the bridge gangplank assembly 116 into the apparatus 100. The gate agent then safely drives boarding bridge 1402 using the control station 1404 to a designated stow location.

Ground personnel disengage the stabilizer assemblies 306 (FIG. 3) and maneuver the apparatus 100 away from the airplane 1408 using the push-bars 108. The apparatus 100 can then be pushed using the push-bars 108 and/or driven using the tow-bar 110 to a stowing location, where the stabilizer assemblies 306 (FIG. 3) can also be deployed to prevent the apparatus from moving while stowed.

Thus, an apparatus to interface a boarding bridge and a low doorsill airplane have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate example embodiment.

The invention claimed is:

1. An apparatus to interface a cab section of a boarding bridge having a first deck and an airplane having a second deck, the apparatus comprising:
  a lower-frame assembly including a plurality of wheel assemblies;
  an upper-frame assembly connected to the lower-frame assembly at a first adjustable height and in a first adjustable pivoting position, the upper-frame assembly including a third deck atop the upper-frame assembly;
  a bridge gangplank assembly connected to a first end of the upper-frame assembly to interface the boarding bridge, the bridge gangplank assembly including a fourth deck to connect the first deck of the boarding bridge and the third deck of the upper frame assembly; and an airplane gangplank assembly articulably connected to a second end of the upper-frame assembly to interface the airplane at one or more positions with respect to the upper-frame assembly, the airplane gangplank assembly including at least a fifth deck to connect the third deck of the upper frame assembly and the second deck of the airplane.

2. The apparatus according to claim 1, wherein the apparatus comprises a jack assembly secured between the lower-frame assembly and the upper-frame assembly to provide height adjustability of the upper-frame assembly with respect to the lower-frame assembly.

3. The apparatus according to claim 1, wherein the apparatus includes a plurality of posts connecting the upper-frame assembly to the lower-frame assembly, the plurality of posts individually adjustable to provide pivoting adjustability of the upper-frame assembly with respect to the lower-frame assembly.

4. The apparatus according to claim 1, wherein the upper-frame assembly comprises arcuate tubular members disposed upright and straight tubular members disposed transversely to the arcuate tubular members to form a tunnel structure.

5. The apparatus according to claim 4, wherein the upper-frame assembly comprises handrails secured to the third deck and the arcuate tubular members.

6. The apparatus according to claim 4, wherein a section of the tunnel structure is covered by a material.

7. The apparatus according to claim 6, wherein the section is a canopy of the tunnel structure.

8. The apparatus according to claim 6, wherein the section is a side of the structure.

9. The apparatus according to claim 4, wherein the apparatus further comprises a canopy secured to an arcuate tubular member of the tunnel structure.

10. The apparatus according to claim 1, wherein the fourth deck of the bridge gangplank assembly comprises:
a first deck section;
a second deck section; and
a hinge securing the first deck section to the second deck section.

11. The apparatus according to claim 10, wherein the first deck section and the second deck section are triangular.

12. The apparatus according to claim 11, wherein the bridge gangplank assembly comprises one or more levelers to adjust the position of the second deck section with respect to the first deck of the boarding bridge.

13. The apparatus according to claim 1, wherein the third deck of the upper-frame assembly comprises:
a first deck section; and
a second deck section.

14. The apparatus according to claim 13, wherein the second deck section is at an angle with respect to the first deck section.

15. The apparatus according to claim 13, wherein the apparatus comprises a connection device integrated with the second deck section to connect with the airplane gangplank assembly.

16. The apparatus according to claim 15, wherein the connection device comprises:
a stacked plurality of flange bearings; and
a plurality of ball bearings partially surrounding the plurality of flange bearings.

17. The apparatus according to claim 16, wherein the fifth deck of the airplane gangplank assembly comprises:
a third deck section;
a fourth deck section; and
a hinge securing the fourth deck section to the third deck section.

18. The apparatus according to claim 17, wherein the apparatus comprises a turntable having a shaft, the turntable being disposed approximately flush with the third deck section, the shaft extending transversely through the third deck section and through the stacked plurality of flange bearings.

19. The apparatus according to claim 1, wherein the apparatus further comprises a proximity post secured to the upper-frame assembly.

20. The apparatus according to claim 19, wherein the proximity post is at least one of pivotable and extensible.

21. The apparatus according to claim 1, wherein the one or more positions include arcuate positions and pivotal positions.

22. The apparatus according to claim 21, wherein the pivotal positions provide zero-balance pivotability to assist in raising and lowering the airplane gangplank assembly.

* * * * *